United States Patent
Freund et al.

(10) Patent No.: US 6,862,389 B2
(45) Date of Patent: Mar. 1, 2005

(54) FIBER ALIGNMENT USING A CHANNEL INCORPORATING A FULCRUM STRUCTURE

(75) Inventors: Joseph Michael Freund, Fogelsville, PA (US); John Michael Geary, Longswamp Township, Berks County, PA (US)

(73) Assignee: TriQuint Technologies Holding Co., Hillsboro, OR (US)

( * ) Notice: Subject to any disclaimer, the term of this patent is extended or adjusted under 35 U.S.C. 154(b) by 89 days.

(21) Appl. No.: 10/230,942

(22) Filed: Aug. 29, 2002

(65) Prior Publication Data

US 2004/0042730 A1 Mar. 4, 2004

(51) Int. Cl.[7] .............................. G02B 6/36; G02B 6/42; G02B 6/43
(52) U.S. Cl. ............................. 385/52; 385/129; 385/50
(58) Field of Search ............................ 385/52, 129, 50, 385/132

(56) References Cited

U.S. PATENT DOCUMENTS

| | | | | |
|---|---|---|---|---|
| 5,518,965 A | * | 5/1996 | Menigaux et al. | 438/31 |
| 5,812,720 A | * | 9/1998 | Dannoux | 385/115 |
| 6,227,724 B1 | * | 5/2001 | Verdiell | 385/91 |
| 6,597,843 B2 | * | 7/2003 | Johnson | 385/52 |
| 6,606,435 B1 | * | 8/2003 | Irie et al. | 385/52 |
| 2002/0076162 A1 | * | 6/2002 | Crafts | 385/49 |
| 2002/0154865 A1 | * | 10/2002 | Lasecki et al. | 385/52 |

FOREIGN PATENT DOCUMENTS

JP          02310507 A   * 12/1990   ........... G02B/06/30

OTHER PUBLICATIONS

Hunziker, et. al. "Self-aligned flip-chip packaging of tilted semiconductor optical amplifier arrays on Si motherboard" Electronics Letters, Mar. 16, 1995, vol. 31, No. 6, pp. 488–490.*

* cited by examiner

*Primary Examiner*—Edward J. Glick
*Assistant Examiner*—Krystyna Suchecki

(57) ABSTRACT

Optical alignment between a communication optical fiber and an optical device is achieved by using a substrate including a fiber-holding channel formed in the top surface of the substrate. The channel is particularly formed to include a central fulcrum region, against which the fiber is pressed into as the fiber-to-device alignment is performed. In particular, the fulcrum functions as a pivot point to allow for the free endface of the fiber nearest the optical device to be adjusted (performing a "fine" adjustment) by manipulating the opposing end of the fiber (using a "gross" movement) until alignment with the optical device is achieved. A reduction of, for example, 14:1 between the gross movement and the fine adjustment can be achieved by using the inventive fulcrum structure.

17 Claims, 5 Drawing Sheets

FIBER ALIGNMENT USING A CHANNEL INCORPORATING A FULCRUM STRUCTURE

TECHNICAL FIELD

The present invention relates to a fiber alignment arrangement and, more particularly, to the use of a fiber-supporting channel including a fulcrum disposed along its longitudinal axis, the fulcrum used as a pivot point to assist in providing alignment between a fiber and an associated optical device.

BACKGROUND OF THE INVENTION

In the realm of optical device packaging, there is beginning to develop a number of assemblies which utilize a single crystal semiconductor material (such as silicon) as the support structure for the various optical devices. Often referred to as "silicon optical bench" technology, the utilization of silicon may result in a significant cost saving in optical packaging over some of the more esoteric materials that have been used in the past. More importantly, silicon processing technology has advanced to the stage where a number of relatively simple procedures (e.g., oxidation, isotropic etching, anisotropic etching, etc.) may be utilized to facilitate attachment of the devices to the support member, as well as alignment therebetween. Further, it is possible to form optical waveguiding structures directly in/on a silicon substrate, resulting in the ability to form a completely operable optical subassembly in silicon.

An exemplary utilization of silicon in the formation of a subassembly for optoelectronic devices is disclosed in U.S. Pat. No. 4,945,400, issued to G. E. Blonder et al. on Jul. 31, 1990. In general, Blonder et al. disclose a subassembly including a semiconductor (e.g., silicon) base and lid including a variety of etched features (e.g., grooves, cavities, alignment detents) and metallization patterns (e.g., contacts, reflectors) which enable an optoelectronic device to be reliably and inexpensively mounted on the base and coupled to a communicating optical fiber. In particular, Blonder et al. disclose an arrangement wherein the optoelectronic device (e.g., LED) is disposed within a cavity formed by a lid member and the communicating fiber is positioned along a groove formed in a base member. A reflective metallization is utilized to optically couple the device to the fiber. Therefore, positioning of the active device with respect to the reflective metallization is the only active alignment step required to provide coupling.

An advance in the area of silicon optical bench packaging is disclosed in U.S. Pat. No. 5,179,609 issued to G. E. Blonder et al. on Jan. 12, 1993. In this arrangement, separate silicon piece parts are used to support an active optical device and a communicating optical fiber. A bare fiber is supported in an etched V-groove formed in a first silicon piece part and fiducials are formed in both piece parts to provide mechanical registration and alignment between the optical fiber and the active device when the two piece parts are mated.

Although such an arrangement is useful in a number of applications, the capability of providing passive alignment with micron-level tolerances becomes problematic, and the need to utilize a number of mating components (e.g., alignment detents and spheres, for example), becomes time-consuming and expensive for high volume production applications.

Thus, a need remains in the art for a simple and efficient technique for providing improved alignment between an optical fiber and active optical device.

SUMMARY OF THE INVENTION

The need remaining in the prior art is addressed by the present invention, which relates to a fiber alignment arrangement and, more particularly, to the use of a fiber-supporting channel including a fulcrum disposed along its longitudinal axis, the fulcrum used as a pivot point to assist in providing alignment between a fiber and an active optical device.

In accordance with the present invention, a fulcrum is formed in approximately the center area of a channel used to support an optical fiber. A fiber is positioned in the channel and pressed in place against the fulcrum with a downward force. The presence of the fulcrum results in the fiber only contacting the channel along the extent of the fulcrum. The fulcrum functions as a pivot point, allowing for a "gross" movement of the fiber outside of the package to provide for a "fine" adjustment of the opposing (perhaps lensed) endface of the fiber inside the package, resulting in submicron alignment between the fiber and an associated optical device.

It has been found that the use of a fulcrum in a fiber channel can provide a passive alignment on the order of ±10 microns. Once alignment on this order has been achieved, an active alignment process is used to provide a sub-micron final alignment. In one embodiment, a 14:1 ("gross" to "fine") reduction in x-y alignment movement is provided between the adjustment of a "far end" of the fiber (i.e., external to the package) and the "near end" of the fiber within the package in proximity to the optical device. For example, a 7 $\mu$m movement in the "+y" direction of the far end of the fiber would translate into a 0.5 $\mu$m adjustment (in the "−y" direction) of the fiber endface inside the package. Once alignment is achieved, the fiber is fixed (e.g., using epoxy or solder) in place along the channel and a cover plate is positioned over the structure to enclose the aligned fiber.

In a preferred alignment technique using the arrangement of the present invention, the fiber is first processed to form a gentle bend in a region between the package wall and the fiber channel (i.e., introducing a plastic deformation along a section of the fiber). The bend is formed to provide an initial downward bias along the fiber, with the endface of the fiber exhibiting a downward angle with respect to the optical axis. This initial downward bias will result in pressing the fiber against the fulcrum, insuring that the fiber will stay in place along the fulcrum during alignment. The induced bend should remain below the curvature that induces microbending losses, yet the curvature needs to be sufficient to allow for x-y-z movement of the fiber during alignment. Moreover, the bend functions to reduce fatigue failure during the lifetime of the packaged fiber, by allowing for the expansion and contraction (elastic deformation) of the fiber between the fixed point at the fulcrum and its fixed location at the package wall.

The utilization of a fiber-supporting channel including a fulcrum is appropriate in applications using a single fiber attachment, a pair of fibers (such as an "input" and an "output"), or an array structure. Silicon is a preferred material used to form the structure, in terms of the ability to accurately and precisely form a V-groove as the channel, where the fulcrum structure may be etched during the same processing step as used to form the V-groove.

Other and further embodiments of the present invention will be apparent during the course of the following discussion and by reference to the accompanying drawings.

BRIEF DESCRIPTION OF THE DRAWINGS

Referring now to the drawings.

DETAILED DESCRIPTION

Figure 1:
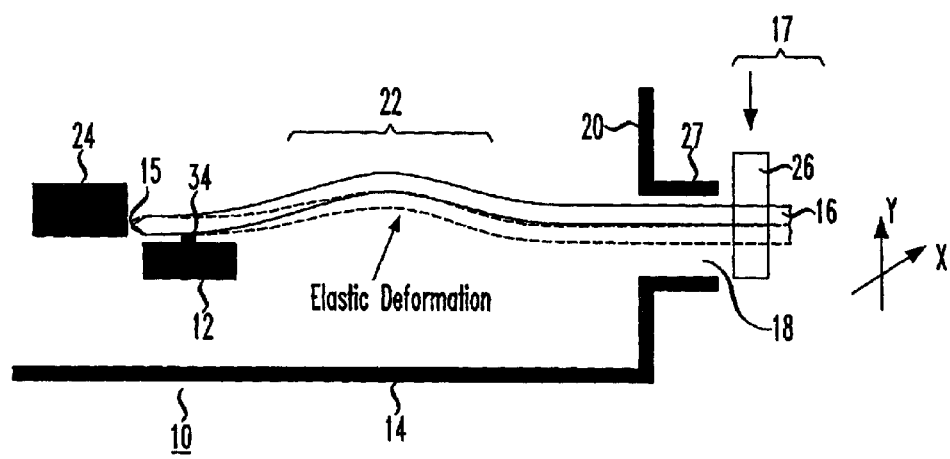
FIG. 1 illustrates, in a side view, an exemplary arrangement for using the fulcrum alignment structure of the present invention.
Figure 2:
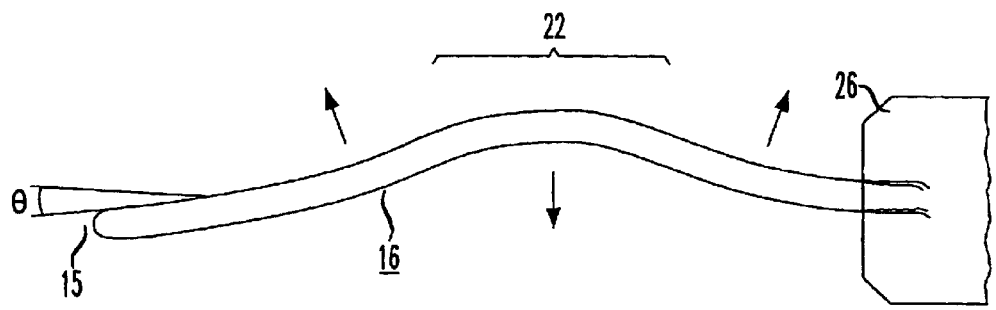
FIG. 2 illustrates an exemplary fiber section including a plastically deformed section, with a downward-directed endface, for providing a bias force against the fulcrum during alignment.

FIG. 1 illustrates an exemplary optical package 10 that includes and utilizes a fulcrum fiber alignment element 12 formed in accordance with the present invention. In general, optical package 10 comprises a housing 14 formed of a material such as Kovar, where an optical communication fiber 16 is inserted through an opening 18 in a sidewall 20 of package 10. In accordance with the present invention, and as will be discussed in detail below, communication fiber 16 may include a lensed endface 15 (see FIGS. 2 and 4), and advantageously is "pre-bent", as shown in FIGS. 1 and 2, along region 22 of fiber 16 to aid in utilizing the fulcrum portion 34 (see FIG. 3) of alignment element 12 to effectuate submicron-level alignment between fiber 16 and an optical device 24 within package 10. In the particular arrangement as illustrated in FIG. 1, a clamp 26 is attached to a portion 17 of fiber 16 exterior of package 10, where clamp 26 is used to move fiber section 17 in the x and y directions, as shown, to achieve alignment between fiber endface 15 and optical device 24. In particular, passive alignment in the x and y directions between fiber 16 and active device 24 is effectuated in accordance with the present invention by moving fiber 16 against fulcrum 34 (that is, using fulcrum 34 as a pivot point) within alignment element 12, providing an alignment within a range of ±10 μm. Submicron alignment may then be perfected by using "active alignment", that is, by turning on optical device 24 and adjusting the position of fiber 16 until maximum coupling (associated with, for example, optimum measured coupled power through fiber 16) is achieved. In one arrangement of the present invention, a 14:1 reduction in the x-y alignment can be achieved, in terms of translating the gross movement of fiber portion 17 to the fine adjustment of fiber endface 15. That is, for example, a 14 μm in the x or y direction of fiber section 17 results in a 1 μm adjustment of endface 15; a 7 μm movement of fiber section 17 yielding a 0.5 μm adjustment of endface 15. It is to be noted that the axial (z-direction) alignment is neither advantaged nor disadvantaged by using the inventive fulcrum structure. As will be discussed below, an epoxy (or other appropriate material) is used to fix fiber section 17 at package wall 20 and fiber 16 at alignment element 12 once total alignment has been achieved. Subsequent to the locking of fiber 16 in place, a coverplate 28 to enclose fiber 16 at alignment element 12 (see FIGS. 5 and 6).

FIG. 2 contains an enlarged view of fiber 16, illustrating both bend region 22 and the initial downward angle θ, with respect to the optical axis, that is imparted to endface 15 of fiber 16. Bend region 22 may be formed by slightly warming fiber 16 for a brief period of time, and controlling the radius of curvature introduced into section 22 of fiber 16. The initial downward bias of endface 15 will allow for the fiber to level out once fiber 16 is positioned against fulcrum 34 of alignment element 12 (as illustrated in phantom in FIG. 1).

Figure 3:
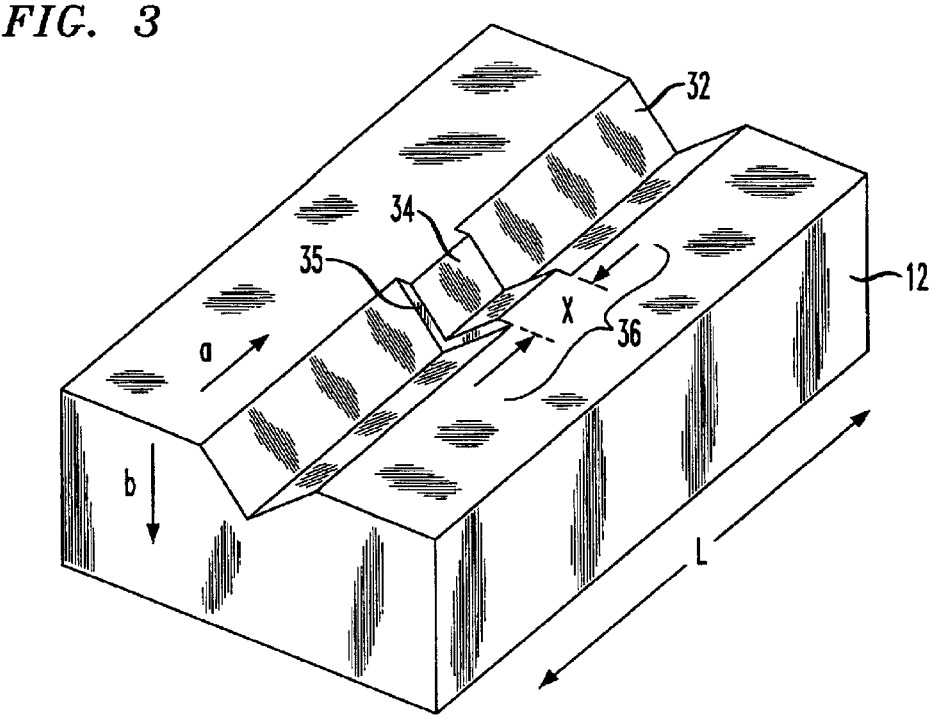
FIG. 3 is an isometric view of an exemplary substrate including a fulcrum V-groove formed in accordance with the present invention.

FIG. 3 illustrates, in an isometric view, an exemplary fulcrum alignment element 12 formed in accordance with the present invention. As shown, alignment element 12 includes a V-groove 32 which is formed along the length L of element 12. It is to be understood that the V-groove geometry is exemplary only, and any other fiber-supporting channel configuration may be used, such as a U-shaped channel, a square-bottom channel, etc. A V-groove, as will be discussed below, may be a preferred embodiment in the case where a silicon substrate is used to form the alignment arrangement, since a V-groove can be easily etched through the top surface of a silicon substrate using well-known techniques. In accordance with the present invention, fulcrum 34 is formed in the central region 36 of V-groove 32, where fulcrum 34 is formed to comprise a length x long enough to support an associated optical fiber (not shown) in a manner such that the fiber remains in contact with fulcrum 34, while also being short enough to function effectively as a pivot point. In one embodiment, fulcrum 34 may comprise a length x of 100 μm (and can deviate from this length by a factor of ±50 μm).

Figure 4:
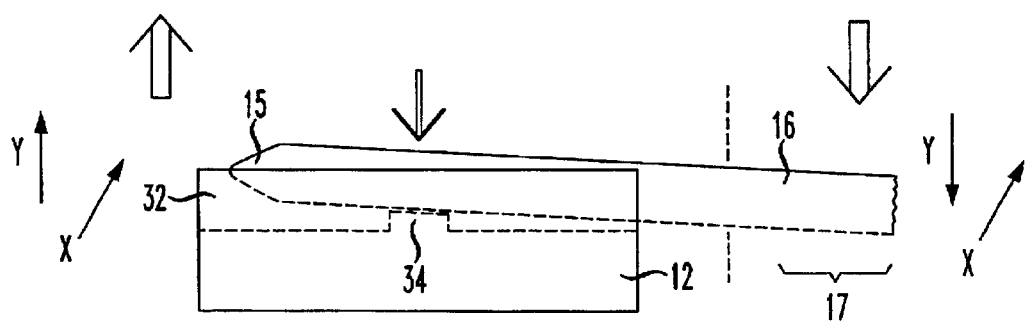
FIG. 4 is a side view of the substrate of FIG. 2, illustrating the possible y-direction movement of a fiber against the fulcrum.

FIG. 4 illustrates, in a side view, alignment element 12 of FIG. 3, including fiber 16 in position against fulcrum 34 of V-groove 32. In this particular embodiment, fiber 16 includes a lensed endface 15. Although not illustrated in FIG. 3, it is presumed that fiber 16 includes pre-bent region 22 as shown in FIG. 1. With this "pre-bend" and the defined downward angle of endface 15 (i.e., plastic deformation) of fiber 16, fiber 16 presses downward into place against fulcrum 34 and therefore resists motion out of the grooved area of fulcrum 34. It is a significant aspect of the present invention that the use of fulcrum 34 results in fiber 16 only contacting V-groove 32 along the extent of fulcrum 34. That is, fiber 16 does not contact any other portion of V-groove 32; it rests only against fulcrum 34, as shown in FIG. 4. In accordance with the teachings of the present invention, therefore, with fiber 16 held in place against fulcrum 34 (particularly using the bias imparted by pre-bend region 22), fiber 16 may be moved in the x and y directions, using fulcrum 34 as a pivot point, until alignment is achieved. This pivoting action is illustrated by the arrows in FIG. 4, where a "−y" movement of section 17 results in a "+y" movement of endface 15 with, for example, a 14:1 reduction in movement between section 17 and endface 15. Without the inclusion of a fulcrum in the V-groove structure, such "fine" motion of fiber 16 cannot be easily achieved. As mentioned above, a passive alignment on the order of ±10 μm can be achieved with the fulcrum V-groove alignment element of the present invention. A more precise "active" alignment is then made, if necessary, by turning on the associated active device and adjusting fiber 16 until maximum coupled power.

As mentioned above, the use of fulcrum 34 as a pivot point yields a reduction in x-y alignment between the gross movement of outer fiber section 17 and the find adjustment of endface 15 of fiber 16. In one case, this reduction was on the scale of 14:1; other reduction ratios are possible and are considered to fall within the spirit and scope of the present invention.

Figure 5:
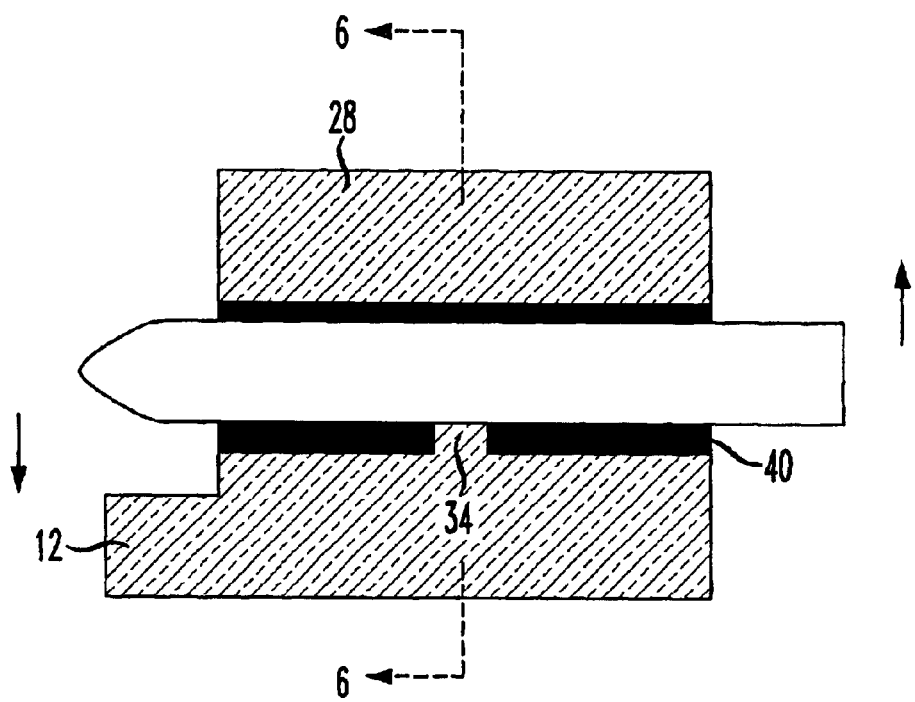
FIG. 5 is a side view of an exemplary fulcrum V-groove substrate and coverplate subsequent to attaching the fiber to the alignment element.
Figure 6:
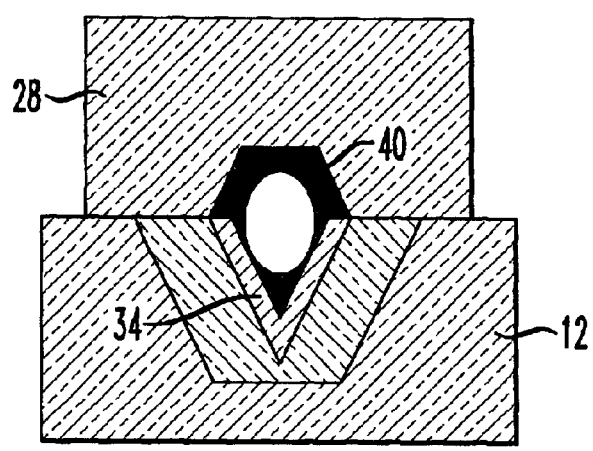
FIG. 6 is a cut-away view of the arrangement of FIG. 5, taken along line 6—6.

Once alignment is obtained, fiber 16 is fixed (e.g., epoxied or soldered) in place at package wall 20, using a fiber access tube 27 in the particular embodiment shown in FIG. 1. After fiber 16 is fixed in place at the package wall, a similar epoxy or adhesive material is deposited on alignment element 12 and used to permanently attach fiber 16 to element 12. Subsequent to this fixing step, coverplate 28 is attached to the arrangement as shown. FIG. 5 is a side view of the arrangement at element 12, where FIG. 6 contains a cut-away view along line 6—6 of FIG. 5, both views clearly showing the location of an exemplary epoxy material 40 within V-groove 32, as well as between the mating surfaces of alignment element 12 and coverplate 28. The end surface of fulcrum 34 can also be seen in the view of FIG. 6. In accordance with the present invention, pre-bend region 22 also advantageously functions to reduce the possibility of fatigue failure of fiber 16 once it is fixed in place, allowing for expansion and contraction of fiber 16 between the two fixed points (i.e., the fixed points being defined as where fiber 16 is attached to fulcrum 34 and where fiber 16 is attached to package wall 20, see FIG. 1).

It is to be understood that the fulcrum alignment element of the present invention may be formed out of any appropriate material for use in an optical packaging arrangement. Various materials that exhibit mechanical and thermal stability may be used, including plastics, ceramics and glass. A preferred material is silicon, in terms of the ability to etch a fulcrum V-groove structure into a top surface of an appropriately oriented silicon substrate. For example, a <100> oriented silicon substrate may be etched using an anisotropic etch such as KOH to simultaneously form both the V-groove and fulcrum structures. Referring back to FIG. 3, once an edge 35 is exposed within groove 32, the etch in the "a" direction (as indicated by the arrow) will be faster than the groove etch in the "b" direction (also indicated by the arrow), so as to allow for fulcrum region 34 to be formed in the central area of V-groove 32. By watching the etch rate along the "a" direction, the extent x of fulcrum 34 can be controlled.

Figure 7:
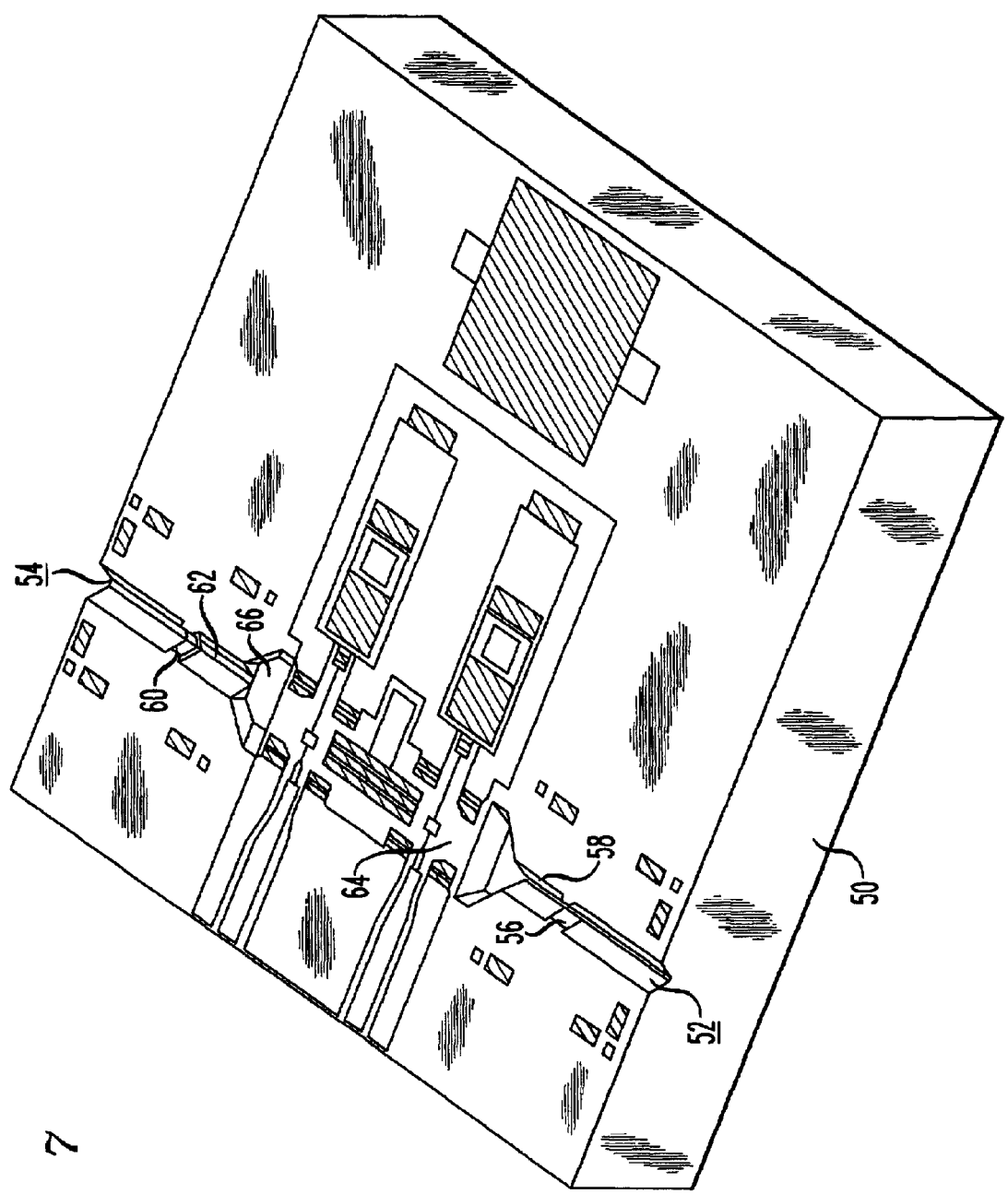
FIG. 7 illustrates an exemplary embodiment of the present invention including a pair of fulcrum V-grooves formed on a single substrate.

Another advantage of using silicon as the substrate material for alignment element 12 is that one or more fulcrum V-groove structures may be directly incorporated into a silicon substrate used to support other active and passive optoelectronic devices within a package. FIG. 7 illustrates an exemplary silicon substrate 50 that has been processed to include a pair of fulcrum V-groove alignment elements 52 and 54. Referring to FIG. 7, fulcrum V-groove 52 alignment element includes a fulcrum 56 formed within a central region of a V-groove 58. Similarly, alignment element 54 is formed to include a fulcrum 60 disposed within the central region of a V-groove 62. Using the method as described above, a transmission fiber (not shown) may be disposed along each groove and aligned with an associated optical device (not shown) disposed at locations 64 and 66 on substrate 50. A coverplate, or pair of coverplates, may then be disposed over the substrate once alignment is achieved.

Figure 8:
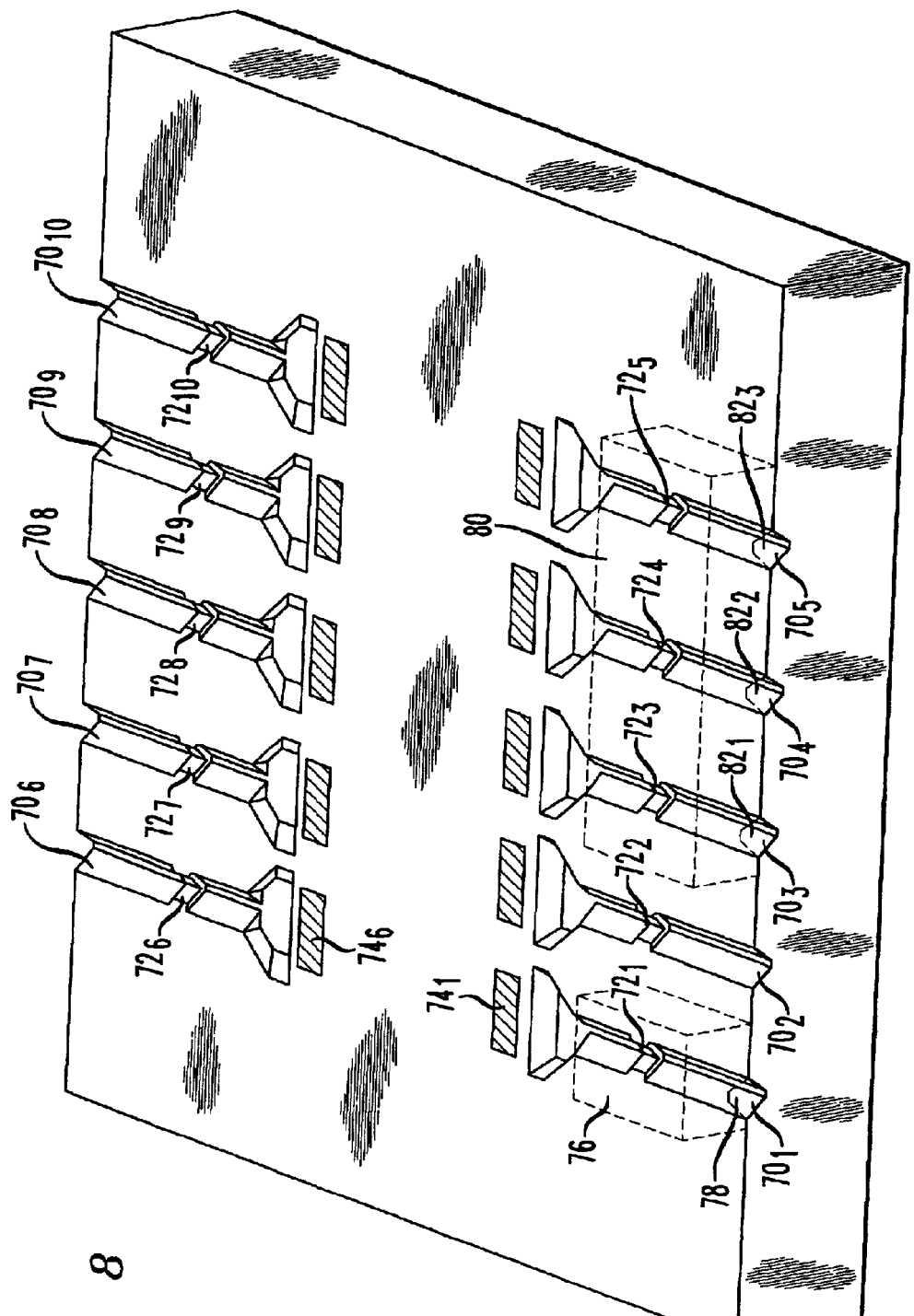
FIG. 8 illustrates an array embodiment of the present invention.

In general, it is possible to form an array of such fulcrum alignment elements within a single supporting substrate. FIG. 8 illustrates one exemplary arrangement, which includes a set of ten such fiber channels denoted $70_1$–$70_{10}$, each including an associated fulcrum region $72_1$–$72_{10}$. The illustrated arrangement comprises V-grooves as the fiber channels; however, it is to be understood that any suitable geometry may be used to form the fiber-supporting element. In accordance with the present invention, a fiber disposed within an exemplary channel $70_1$ is then adjusted, using fulcrum $72_1$ as a pivot point, to achieve alignment between the fiber endface and an optical device disposed at location $74_i$ associated with channel $70_i$. When a silicon substrate is used to support such an array structure, it is possible to form V-grooves as fiber channels 70 with a groove-to-groove spacing of, for example, 200 $\mu$m. As with the single element and "pair" embodiments, a coverplate may be included in the final array structure, as shown in FIG. 8, to encapsulate the aligned fibers. There are various coverplate arrangements that may be used. For example, a plurality of separate coverplates, such as coverplate 76, may be used, where coverplate 76 is formed to include a V-groove 78 to prevent contact between coverplate 76 and the encapsulated fiber. Alternatively, a single coverplate may be formed to encapsulate several aligned fibers. Referring to FIG. 8, coverplate 80 is shown disposed over V-grooves $70_3$–$70_5$, and includes a set of three V-grooves $82_1$, $82_2$ and $82_3$ disposed to align with substrate V-grooves $70_3$–$70_5$.

Although the present invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A support element for facilitating optical alignment between an endface of an optical communication fiber and an optical device, the support element comprising a substrate, including a top major surface, with a fiber channel formed along a predetermined longitudinal extent, defined as the z-axis, of said top major surface; and a fulcrum disposed along a central portion of said channel, said fulcrum for supporting an optical fiber positioned along said channel and functioning as a pivot point to allow for relative motion of the endface of said fiber in the x-y plane as said fiber remains pressed into said fulcrum so as to provide x-y direction alignment between said fiber endface and an associated optical device.

2. The support element as defined in claim 1 wherein the support element further comprises a coverplate disposed to contact the substrate top major surface and enclose an associated communication fiber between said coverplate and said substrate.

3. The support element as defined in claim 1 wherein the element further comprises an epoxy adhesive used to fix the communication fiber to the fulcrum and channel once alignment is achieved.

4. The support element as defined in claim 1 wherein the element further comprises a solder adhesive used to fix the communication fiber to the fulcrum and channel once alignment is achieved.

5. The support element as defined in claim 1 wherein the substrate comprises silicon.

6. The support element as defined in claim 1 wherein the fiber channel comprises a V-groove structure.

7. The support element as defined in claim 6 wherein the V-groove structure comprises an etched V-groove.

8. A support element for facilitating optical alignment between a plurality of N optical communication fibers and one or more optical devices, the support element comprising
   a substrate, including a top major surface, with a plurality of N fiber channels formed at predetermined locations across said substrate top major surface in a defined z-axis direction; and
   a plurality of N fulcrums, each disposed along a central portion of an associated fiber channel, each fulcrum for supporting a separate one of the plurality of N optical fibers and functioning as a pivot point to allow for relative motion in the x-y plane of an endface of said fiber as said fiber remains pressed into said fulcrum so as to provide x-y direction alignment between said fiber and an associated optical device.

9. A support element as defined in claim 8 wherein the support element further comprises a coverplate so as to enclose the plurality of N channels.

10. A support element as defined in claim 8 wherein the support element further comprises a plurality of N coverplates, each coverplate disposed to cover a separate one of the plurality of N channels formed in the substrate.

11. A support element as defined in claim 8 wherein the substrate comprises silicon and the plurality of N channels comprise a plurality of N V-grooves.

12. A method of providing optical alignment between an optical communication fiber and an active optical device, the method comprising the steps of:
   providing an alignment element including a longitudinally disposed channel, defined as the z-axis, with a fulcrum structure disposed along a central region of said channel;
   positioning an optical fiber along said channel such that said fiber is pressed against only the fulcrum structure, a first end of said fiber for coupling light into and out of an associated active optical device and a second end extending out beyond said alignment element;
   using said fulcrum as a pivot point, moving the second end of said fiber in the x and y directions to adjust the position of said first end so as to provide alignment between said first end of said fiber and said active optical device.

13. The method as defined in claim 12 wherein prior to positioning the optical fiber along the channel, the following step is performed:
   imparting a bend along a predetermined section of the optical communication fiber, said bend functioning to apply a downward bias force along said fiber into the fulcrum structure of the channel.

14. The method as defined in claim 12 wherein the method further comprises the step of:
   forming a lensed endface along the first end of the optical communication fiber.

15. The method as defined in claim 12 wherein the method further comprises the steps of:
   fixing the aligned fiber to the channel and the fulcrum; and
   positioning a coverplate over the substrate so as to enclose said substrate.

16. The method as defined in claim 15, wherein in performing the fixing steps, an epoxy is used to form the attachments.

17. The method as defined in claim 15, wherein in performing the fixing steps, a solder is used to form the attachments.

* * * * *